United States Patent [19]
Guillet et al.

[11] 4,145,516
[45] Mar. 20, 1979

[54] PHOTODEGRADABLE POLYURETHANE COMPOSITIONS

[75] Inventors: James E. Guillet, Don Mills; Ervin Dan, Toronto, both of Canada

[73] Assignee: The Governing Council of the University of Toronto, Toronto, Canada

[21] Appl. No.: 795,800

[22] Filed: May 11, 1977

Related U.S. Application Data

[60] Division of Ser. No. 554,451, Mar. 3, 1975, Pat. No. 4,042,568, which is a division of Ser. No. 245,176, Apr. 18, 1972, Pat. No. 3,878,169, which is a continuation-in-part of Ser. No. 135,426, Apr. 18, 1971, abandoned.

[30] Foreign Application Priority Data

Apr. 27, 1970 [GB] United Kingdom ............... 20102/70
Jul. 15, 1970 [GB] United Kingdom ............... 34238/70

[51] Int. Cl.² .................... C08G 28/42; C08G 18/48
[52] U.S. Cl. ........................................ 528/85; 528/74; 528/75; 528/76; 528/77; 528/79; 528/80; 528/81; 528/83; 528/84
[58] Field of Search .......... 260/63 N, 63 R, DIG. 43; 528/74, 75, 76, 77, 79, 80, 81, 83, 84, 85

[56] References Cited
U.S. PATENT DOCUMENTS

| | | | |
|---|---|---|---|
| 2,279,752 | 4/1942 | Jacobson | 260/78 |
| 2,769,783 | 11/1956 | Hollyday, Jr. | 252/45 |
| 2,840,608 | 6/1958 | Crawford et al. | 260/537 |
| 3,039,996 | 6/1962 | Ferstandig et al. | 260/63 |

Primary Examiner—Lester L. Lee
Attorney, Agent, or Firm—Hirons & Rogers

[57] ABSTRACT

Condensation polymers such as polyamides, polyesters, polyurethanes, polyepoxides, polyamide esters, polyureas and polyamino-acids which are photodegradable on exposure to U.V. light, due to the presence in the copolymer backbone of units of structure

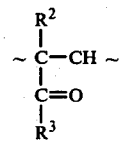

in small amounts.

4 Claims, No Drawings

PHOTODEGRADABLE POLYURETHANE COMPOSITIONS

CROSS REFERENCE TO RELATED APPLICATION

This is a division, of application Ser. No. 554,451, filed Mar. 3, 1975, now U.S. Pat. No. 4,042,568, which is a divisional application Ser. No. 245,176, filed Apr. 18, 1972, now U.S. Pat. No. 3,878,169, which was in turn a continuation-in-part of U.S. application Ser. No. 135,426, filed Apr. 18, 1971, now abandoned.

BACKGROUND OF THE INVENTION

This invention relates to disposable plastic packaging materials, such as films, wrappers, cups, bottles, trays, cartons and the like used for packaging perishable commodities such as food, condiments, beverages etc, and household products in general. The invention also relates to plastic compositions suitable for use in such packaging materials. More specifically, it relates to plastic packaging materials, and plastic compositions for use therein, which when discarded in an outdoor environment will degrade to become part of the soil, or be washed away by rainfall or wind erosion in a harmless form.

The increasing use of plastic packaging materials which are then discarded has created serious problems of pollution and litter. Because most conventional plastic materials used in packaging have long lifetimes in exterior environments the accumulation of litter of these materials in parks and recreational areas, and even in conventional garbage dumps, has led to many environmental and esthetic problems.

Materials which gradually decompose would, of course, solve the litter and pollution problem, provided they decomposed relatively rapidly. Such materials could perhaps be made by including in a packaging plastic an agent which causes the material to decompose. However, against this factor of desirable decomposition must be weighed the requirement that the shelf life of the packaging plastic must be rigidly controlled, and in most cases must be indefinitely long, for proper protection of the perishable contents.

The present invention provides polymeric packaging materials which degrade under the action of the ultraviolet light of the sun, but do not degrade to any appreciable extent otherwise. Thus these polymeric packaging materials start to degrade after they have been discarded in an outdoor environment, but have indefinite storage life indoors, out of contact with direct sunshine.

The wavelengths of light emitted by the sun range from about 2,900A in the ultraviolet to about 20,000A in the infra-red. Only the light with wavelengths ranging from about 4,000 to 8,000A is visible to the human eye. Indoor lighting fixtures emit primarily in this visible range. The present invention is based upon the discovery that there can be introduced into a polymer certain photochemically active chemical groups which do not absorb light of wavelength in the visible range, but do absorb ultraviolet radiation in the wavelength range from 3,000A to 3,500. Having absorbed radiation, the groups cause scission of the polymer chains, and hence degradation of the polymer. Thus the degradation process is not initiated until the polymer is exposed to the ultraviolet light of the sun. Furthermore, because ordinary window glass absorbs most of the ultraviolet radiation of the sun, these polymers will not degrade in sunlight which has passed through window glass. Packages or containers made of these materials could be exhibited in store windows, for example, without initiating the degradation process.

One of the more important classes of plastic materials used for container and packaging purposes are the polyamides such as 6-6 nylon (polyhexamethylene adipamide), 6-12 nylon, polyesters such as polyethylene terephthalate and other polymers coming under the general category of condensation polymers. These polymers break down slowly by photo-oxidation and hydrolysis in an outdoor environment, but molded and extruded objects still retain their shape and an appreciable portion of their original strength for several years under normal weather conditions.

SUMMARY OF THE INVENTION

The present invention provides condensation polymers which are substantially totally stable when exposed to visible light, but which photodegrade on exposure to ultraviolet, i.e. on exposure to direct sunlight. Such polymers are condensation polymers, such as polyamides, polyesters, polyurethanes, etc. containing keto carbonyl groups in side chains, in small amounts.

Thus according to the present invention there is provided a condensation copolymer containing keto carbonyl groups, said keto carbonyl groups being located in a side chain at a position immediately adjacent to the main polymeric chain, the amount of said keto carbonyl groups. This amount is from about 0.01 weight % to about 3 weight %, based on the total copolymer sufficient to cause accelerated photodegradation of the condensation polymer to a brittle or friable condition on exposure to ultraviolet light. The other basic desirable properties of well-known polyamide, polyester, and the like condensation polymers are not, however, substantially changed.

THE PREFERRED EMBODIMENTS

According to the preferred embodiments of the invention, the structure in the main polymeric chain contains units of the form:

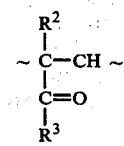

wherein $R^3$ is an alkyl, aryl, alkaryl or alkenyl group of from 1-12 carbon atoms and preferably from 1-2 carbon atoms, and $R^2$ is hydrogen or an alkyl group of from 1 to 6 carbon atoms. When the keto carbonyl group is adjacent to the main polymeric chain or backbone, the rate of photodegradation of the polymer is faster than when the keto carbonyl group forms part of the main polymeric chain or backbone.

Such groups may be included in the polymer by including certain comonomers in the polymerization step or by subsequent reaction with the preformed polymer. The simplest procedure is to prepare the copolymer with a suitable amount of a difunctional condensable monomer such as a dibasic acid of the general structure:

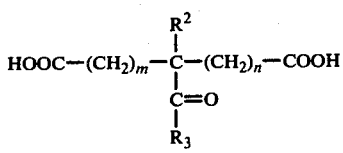

or a diamine having the structure:

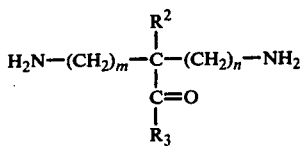

where m is an integer from 0-6, suitably from 1-6, preferably from 2-4, and n is an integer from 1-6 and preferably 2-4, and $R^2$ and $R^3$ are as previously defined, or a glycol of the structure:

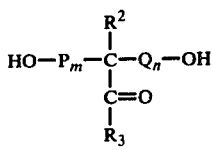

where P is selected from the group consisting of methylene chains having 0-6 carbon atoms, and methylene chains of 2-6 carbon atoms interrupted by ester linkages, and Q is selected from the group consisting of methylene chains having 1-6 carbon atoms, and methylene chains of 2-6 carbon atoms interrupted by ester linkages, and $R^2$ and $R^3$ are as defined previously. Thus, the keto group may be derived from a monomer of general formula:

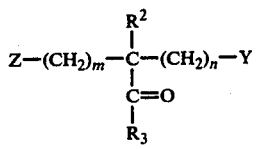

where Y and Z are functional groups capable of condensation copolymerization, independently selected from among hydroxyl, carboxylic acid and functional derivatives thereof, which include acid halides, esters, salts and the like, amine, amine salts, isocyanates, epoxies and the like.

The inclusion of the ketone group in the polymer chain permits the absorption of ultraviolet light in the range from 3000Å-3400Å, and in solution all copolymers containing this ketone linkage adjacent to the chain will degrade quite rapidly when exposed to U.V. light. The degradation occurs as a result of scission of the main chain of the polymer at the carbon atom adjacent to the carbonyl, and usually results in the formation of a double bond.

Examples of suitable acids useful as monomers to incorporate the aforementioned structural unit are keto substituted derivatives of straight chain α,ω-dibasic aliphatic acids such as adipic acid, pimelic acid, suberic acid, azelaic acid and sebacic acid. It is preferred that the acid, used have at least 2 carbon atoms between the carboxyl groups therein, and that the oxygen of the ketone substituent group be attached to carbon atoms other than a carbon atom at position α to a carboxyl group. Otherwise, in the resultant condensation polymer, the ketone carbonyl will be in such close proximity to an ester or amido carbonyl group that its absorption will be affected. It will tend to absorb radiation, and hence cause degradation of the polymer, at Wavelengths in the visible region.

It is to be understood that, when the specification refers to acids, functional derivatives which perform in the same manner as acids, such as acid halides, esters, salts and the like, are also included.

Among the most preferred is γ-acetyl pimelic acid, of formula:

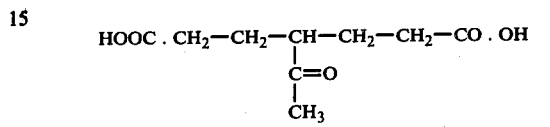

However, many other similar materials can be used, such as γ-benzoyl pimelic acid and functional derivatives thereof, γ-acetyl suberic acid, δ-acetyl azelaic acid and the like.

Such keto substituted acids and functional derivatives thereof, and methods for their preparation, are known in the art. See for example U.S. Pat. No. 2,438,961, Albert B. Boese, issued Apr. 6, 1948. According to this method a diacyl-α,ω-dicyanogen is hydrolysed to the corresponding α,ω-diacid, with the concurrent loss of one acetyl group, to give a keto substituted diacid as hereinbefore defined. A further method is described in U.S. Pat. No. 2,342,606, Herman A. Bruson, issued Feb. 22, 1944. This method prepares the keto substituted dibasic acids by hydrolysis of the corresponding keto-substituted α,ω-di-nitrile compounds.

The diamines which can be used can have generally similar structures to the above diacids. Preferably the oxygen of the ketonic group is attached to a carbon atom which is no closer than β to either amino group, so as to avoid the possible interference of the amide linkages with the absorption spectrum of the ketone side chain groups. Suitable examples of such diamines are γ-acetyl-pentamethylene-α,ω-diamine and γ-acetyl-hexamethylene-α,ω-diamine.

Such keto substituted diamines and methods for their preparation are known in the art. For example they may be prepared by mild reduction of the corresponding α,ω-dinitrile compounds referred to previously, according to the method of Wily and Adkins, Journal of the American Chemical Society, Vol. 60, page 914 (1938). As an alternative they can be prepared from the corresponding dibasic acids previously referred to, by the method of Wallis et al., "Organic Reactions", Vol. 3, page 267, or by the method of Smith, "Organic Reactions", Vol. 3, page 337.

The glycols which can be used have similar structural requirements to the diacids and diamines described above. Once again, it is preferred that the oxygen of the ketonic group is attached to a carbon atom which is not closer than β to either hydroxyl group. Suitable examples of such glycols are γ-acetyl-pentamethylene-α,ω-glycol and γ-acetyl-hexamethylene-α,ω-glycol.

Such glycols (or diols) and methods for their preparation are known in the art. They can be prepared by an aldol condensation reaction, as described in British Patent Specification No. 922,975, for example.

It will of course be understood that it is not necessary to use both a ketone-substituted acid and a keton substituted amine in preparing the polyamides of this invention. Only one of the monomers need contain carbonyl groups. The requirement is that the product must contain some keto-carbonyl side chain groups in an amount sufficient to cause photodegradation. It is thus unimportant whether the groups are derived from the amine, acid or both. Similarly in preparing polyesters of the present invention, the keto groups can be derived from either or both monomers. In a further embodiment, amino acids can be copolymerized with the keto-containing monomer. In this category of amino acids, there are included the lactams such as caprolactam, valerotactam, and butyrolactam.

A further type of condensation copolymer in accordance with the present invention is a polyurethane, in which one of the monomers, either a diol or a diisocyanate, contains the aforementioned keto carbonyl group.

One of the specific classes of novel materials in accordance with the present invention is the class of copolyamides having side chain keto carbonyl groups of the general formula:

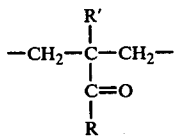

within its polymeric structure. For the most rapid photodegradation on exposure to ultraviolet radiation, the copolyamide should have a glass transition temperature Tg lower than ambient temperature, that is less than about 20°-30° C. The reason for this is as follows: It has been discovered that the chain scission process initiated by the absorption of light by the carbonyl group adjacent to the copolyamide chain is only effective if there is sufficient mobility in the molecule to form a transient intermediate or excited state. At temperatures below the glass transition temperature the mobility of the polymer chains is low. It has been found experimentally that the efficiency of the photo-chemical scission process in the solid polymer is greatly reduced at such temperatures. It therefore takes a much longer time to degrade the polymer at temperatures below Tg than it does above Tg. Thus if it is required that the plastic material degrade relatively rapidly, i.e. over a period of a few weeks, when discarded under ordinary environmental conditions, the glass transition temperature of the material should be less than the ambient temperature at which the object will be exposed to the sun's radiation. This temperature may of course vary somewhat depending on the dlimate of the locality in which the material is to be used, being much higher in tropical regions than in the artic. However, for temperature climates a material having a glass transition less thab about 20°-30° C. is desirable.

Methods of controlling the glass transition temperature of the copolyamide are well known. For example, one may reduce the glass transition temperature, Tg, by the addition of a plasticizer, although these are not commonly used for polyamides. Careful selection of suitable monomers is preferred for controlling Tg. The use of a branched chain diacid or diamine as one of the comonomers in the copolyamide tends to reduce both the melting point and the glass transition temperature. This method is to be preferred in the invention, since the groups so introduced will not in general affect the photochemistry of the system, and as they form part of the polymer system they will not migrate or be extractable.

Also, in order to have physical properties appropriate to form films or molded objects with sufficient strength and stiffness to be used as packaging material, the copolyamides shoudl be crystalline, and have a melting point exceeding about 90°-100° C.

The requirement that the glass transition temperature Tg should be lower than about 20° C. is appropriate for materials that are to photodegrade relatively rapidly. However, materials which photodegrade more slowly, over periods of 1 year or so, are also useful in many applications, and certainily provide improvements over conventional plastics materials as regards litter and disposal problems. Such materials do not need to have such low Tg, and are within the broad scope of this invention.

In order to achieve the maximum effect it is desirable that the ketone groups be distributed throughout the entire polymer chain and preferably a maximum distance from each other. Further, most of the polymer should preferably contain some ketonic groups, otherwise some of the polymer may not degrade photochemically. These conditions can usually be met by employing suitable control of the reaction conditions.

Polyamide ester condensation polymers, polyureas and polyepoxides are further examples of materials which can be made photodegradable in accordance with the invention, using suitable keto containing monomers.

As will be clear from the foregoing, the process and compositions which can be used in the practice of our invention are not restricted to binary copolymmers but will also apply to multi-component condensation copolymers with a variety of dibasic acids, diamines, glycols, or isocyanates. Polyamide esters are examples of such copolymers being derived from diacids, diamines and glycols, in the correct proportions.

The diabasic acids, diamines, glycols and diisocyanates used in combination with the monomers containing keto carbonyl groups in preparing the copolymers of the invention may be any of those known to be useful in condensation reactions.

Useful diabasic acids may be defined by the general formula $HOOC - R^1 - COOH$ where $R^1$ is a divalent hydrocarbon radical which may be aliphatic, alicyclic, aromatic or araliphatic radicals, substituted or unsubstituted. Representative examples of such diabasic acids are:

| | |
|---|---|
| malonic | acid |
| succinic | " |
| glutaric | " |
| adipic | " |
| pimelic | " |
| suberic | " |
| azelaic | " |
| maleic | acid |
| fumaric | " |
| itaconic | " |
| 1,4-cyclohexane dicarboxylic | " |
| sebacic | " |
| phthalic | " |
| isophthalic | " |
| terephthalic | " |
| phenylene diacetic | " |

Useful diamines may be defined by the general formula $H_2N-R-NH_2$ where R is a divalent hydrocarbon radical selected from the group consisting of aliphatic, alicyclic, aromatic and araliphatic radicals, substituted or unsubstituted. Representative examples of such diamines are:
dimethylenediamine
trimethylenediamine
tetramethylenediamine
pentamethylenediamine
hexamethylenediamine
1,2-diaminopropane
benzidine (4,4'-diaminobiphenyl)
Ortho-tolidine
Ortho-phenylenediamine
Meta-phenylenediamine
Para-phenylenediamine
2,2'-diamino-1,1'-dinaphthyl
para-xylylene diamine
Octamethylene diamine
Heptamethylene diamine
Nonamethylene diamine
Decamethylene diamine
Undecamethylene diamine
Dodecamethylene diamine
1,4-cyclohexane diamine Useful glycols may be defined by the general formula $HO-R^4-OH$ where $R^4$ is an organic radical selected from the group consisting of aliphatic, aromatic, alicyclic and araliphatic hydrocarbon radicals, substituted or unsubstituted, polyether radicals, and polyester radicals. Hydrocarbon glycols, particularly alkylene glycols, are preferred, for most condensation copolymers. In the preparation of polyurethanes, however, polyols are among the preferred hydroxyl compounds, especially polyester and polyether glycols and polyols. Representative examples of suitable glycols and polyols are:
ethylene glycol
polyethylene glycol
propylene glycol
polypropylene glycol
butanediols
pentanediols
hexanediols
higher alkanediols
bisphenols
1,4-cyclohexane dimethanol
polyester glycols and polyols
polyether glycols and polyols Useful diisocyanates may be defined by the general formula:

$$OCN-R^5-NCO$$

where $R^5$ is a divalent hydrocarbon radical consisting of aliphatic, aromatic, alicyclic and araliphatic. Representative examples of such monomers are:
tolylene diisocyanates
diphenylmethane-4,4'-diisocyanate
polymethylene polyphenyl isocyanate
p.phenylene diisocyanate
mesyl diisocyanate
4,4'-dicyclohexyl methane diisocyanate
xylylene diisocyanates
methyl cyclohexyl diisocyanates
isophorone diisocyanate Useful diepoxides may be defined by the general formula:

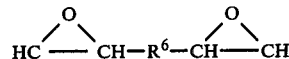

where $R^6$ represents a divalent hydrocarbon or polyether group.

The amount of ketone carbonyl included in the polymer is preferably within the range 0.01–3 weight %, based upon the total of polymeric materials. The amount will usually be determined by the rate and extent of degradation required, and as previously discussed the glass transition temperature of the material. Higher concentrations of keto carbonyl lead to faster degradation rates up to a limit determined by the thickness of the object to be fabricated from the plastic. If too much carbonyl is included only the surface layers will absorb the U.V. light and in the absence of some means of removing these surface layers and their photodegradation products, very little degradation will occur in the bulk of the material. The optimum concentration can be calculated for a given specimen thickness using the Beer-Lambert Law of photochemistry. For this reason, polymers to be extruded as thin films may contain higher carbonyl concentrations than those used in the manufacture of thicker sections such as in bottles or waste containers.

At keto carbonyl amounts less than about 0.01 weight percent based upon the total copolymer, the accelerated rate of photodegradation is hardly practically significant. Amounts more than about 3 weight percent show little practical advantage. Further, if the amount is increased above this figure, the condensation copolymer has to contain such large amounts of the keto-containing monomer that the basic, desirable physical properties of the condensation copolymers, which are well known and around which their extensive applications have been developed, are affected. This is undesirable. It is desired to preserve the basic properties of well established polyamides, polyesters and the like. To obtain such small amounts of keto carbonyl, it is in most cases necessary to use at least 2 other condensation copolymerizable monomers in addition to that containing the keto group. This is usually necessary in order to provide substantially equivalent amounts of condensable chemical groups in the copolymerization recipe.

In summary, therefore, the present invention in general has the following features:

(1) A condensation polymer is synthesized by any of the well known methods of preparing such polymers, to contain a group of the general structure:

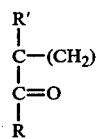

(2) The molecular weight of the copolymer should be such that good physical properties may be obtained in molded or extruded objects, and preferably crystalline materials with melting point above 90° C. and Tg below about 20° C. are prepared.

(3) The copolymeric resin so produced is used to prepare plastic films, blown bottles or molded containers, by any of the usual processes for fabricating thermoplastic materials.

(4) These plastic films and containers are used to package various items such as foods, beverages, condiments, medicines salves, etc, and after use the packages can be discarded out of doors.

The advantage of the compositions of this invention are that when so used, the packaging materials will decompose when exposed to the ultraviolet radiation of the sun, and will shortly break up under the action of wind, rain and other forms of natural erosion. In this form they are susceptible to attack by micro-organisims to become part of the natural soil.

The rate at which plastic films or molded pieces degrade in the presence of ultraviolet light can be determined in the laboratory using a mercury vapor arc and filter system. The apparatus consists of a 250 watt medium pressure mercury lamp (A.E.I. type ME/D), with a quartz lens which focusses the light from the lamp into a parallel beam. A solution filter is used to eliminate the visible and infra-red radiation and an interference filter isolates the mercury line at 3130Å. This light then impinges on the plastic film or molded object which is held in a metal frame in a metal block thermostatted to maintain its temperature at 25° C. The intensity of the light is monitored with a photocell behind the plastic specimen. The response to the photocell is calibrated using a uranyl oxalate actinometer. To determine the amount of light absorbed, the intensity of the lamp is measured before and after each exposure using the photocell. The intensity of the light passing through the plastic can also be measured during exposure. The lamp intensity depends on various factors such as the voltage supplied, the age of the lamp, and the characteristics of the filters used. In a typical experiment, an exposure of 24 hours in the lamp system is equivalent to the amount of U.V. radiation received in the same area of a plastic sample in an average summer month.

The efficiency and rate of photodegradation is determined by measuring the number average molecular weight of the specimen before and after irradiation. The quantity $$\left[ \frac{(M_n)^\circ - 1}{M_n} \right]$$

is the number of bonds broken per original polymer molecule in the specimen. Usually 5 to 10 breaks are sufficient, with a polymer of initial molecular weight 50,000–100,000 to render the material brittle and friable so that it will break up under the action of normal erosion processes. This corresponds to an approximate ketone carbonyl content — the polymer of from about 0.2 to 0.6 weight percent. The efficiency of the process is the total number of main chain bonds broker per quantum of light absorbed. This is called the quantum yield $\phi$, and ranges from about 0.003 to unity depending on the structure of the polymer and other factors. The larger the value of $\phi$, the more rapid is the degradation process.

The relation between the quantum yield $\phi$ and the rate of degradation for specimens of various thickness is given in Table 5. These data are calculated assuming a ketone absorption spectrum similar to that of diethyl ketone and an average intensity of U.V. light of $1.14 \times 10^{-3}$ einsteins per square cm per year. This is estimated to be the amount available in normal sunlight on a plane surface in Washington, D.C. in a normal year. This will obviously change depending on geographic location, but is sufficient to give an idea of the way in which the degradation can be controlled.

TABLE 5

| Thickness/ Quantum Yield | \multicolumn{5}{c}{Time Required for 10 Chain Breaks per Polymer Molecule (based) on U.V. data Washington D.C. average)} |
|---|---|---|---|---|---|
| | 100 mil 2 mm | 50 mil 1 mm | 10 mil 0.2 mm | 5 mil 0.1 mm | 1 mil 0.02 mm |
| $\phi = 0.2$ | 2 months | 1 month | 6 days | 3 days | 1 day |
| $\phi = 0.1$ | 4 months | 2 months | 12 days | 6 days | 1 ay |
| $\phi = 0.02$ | 20 months | 10 months | 2 months | 1 month | 6 days |
| $\phi = 0.01$ | 40 months | 20 months | 4 months | 2 months | 12 days |
| $\phi = 0.001$ | 34 years | 17 years | 3.2 years | 1.6 years | 3 months |
| $\phi = 0.0001$ | | | | | 30 months |

The copolymers of the invention can be prepared by any of the conventional means of condensation polymerization. They may be prepared in batch autoclaves, or as is more common in industrial practice, in continuous stirred reactors. Small amounts of antioxidants and other additives may be present during polymerization or added later. They may be processed in conventional molding, extruding, blow-molding or other fabrication processes. They may be used as injection molded objects such as containers, or as extruded films or blown bottles.

The invention is illustrated but not limited by the following examples:

EXAMPLE 1

Preparation of 6—6 Polyamide (Comparative)

A solution of 2.32 g of hexamethylene diamine and 1.60 g of sodium hydroxide was dissolved in 220 ml water in a Waring Blender. With the blender at medium speed a solution of 3.70 g of adipyl chloride in 140 ml tetrachloroethylene was added over a 30 second period. After 2 minutes stirring 100 ml of 3% aqueous hydrochloric acid was added to stop the polymerization. The polymer was then filtered on a sintered glass filter and washed with water until free of salt. The polymer was dried three hours in air at 80° C. The yield was 4.3 g of polymer having an inherent viscosity in m-cresol of 1.4. It had a glass transition temperature Tg of 55° C. as measured by a Perkin Elmer Differential Scanning Calorimeter.

EXAMPLE 2

The procedure of Example 1 was repeated except that 4.6 g of γ-acetyl pimelic acid dichloride was used in place of adipyl chloride. This represents about 10 weight % carbonyl, based on total polymer. The yield was 6.2 g of a copolyamide having an inherent viscosity of 1.22. A portion of the polymer was pressed into a thick film in a Carver Laboratory Press at 250° C., and an infra-red spectrum of the film showed an absorption band at 5.9μ characteristic of the ketone carbonyl.

EXAMPLE 3

The procedure of Example 1 was repeated except that 3.30 g adipyl chloride and 0.46 g of γ-acetyl pimelic acid chloride were used with the diamine. This represents about 1 weight % keto carbonyl, based on total polymer. 5.2 g of polymer were obtained with an intrinsic viscosity of 1.45. A molded film of this polymer showed a small but finite absorbance in the infra-red, characteristic of the ketone carbonyl.

EXAMPLE 4

The procedure of Example 1 was repeated except that the acid chloride used consisted of a mixture of 0.46 g of γ-acetyl pimelic acid chloride and 4.0 g of 3 methyl adipyl chloride. This represents about 1 weight % keto carbonyl, based on total polymer. The yield of polymer was 6.3 g, having an inherent viscosity of 1.52 and showed evidence of ketone groups by infra-red absorption of the solid film.

EXAMPLE 5

The procedure of Example 1 was repeated except that the acid chloride used consisted of a mixture of 0.92 g of γ-acetyl pimelic acid chloride and 3.80 g of sebacyl chloride. This represents about 2 weight % of keto carbonyl based on total polymer. The yield of polymer was 6.8 g having an inherent viscosity of 1.73 and showed evidence of ketone groups by infra-red absorption.

EXAMPLE 6

The procedure of Example 1 was repeated except that the acid chloride used consisted of a mixture of 1.02 g of γ-benzoyl pimelic acid chloride and 3.80 g of sebacyl chloride. This represents about 2 weight % of keto carbonyl, based on total polymer. The yield of polymer was 7.2 g having an inherent viscosity of 1.43 and showed evidence of ketone groups by infra-red absorption spectroscopy.

EXAMPLE 7

Films were pressed from the copolyamides whose preparation is described in Examples 1-6 using a Carver Press at a temperature of 270° C. and a pressure of 24,000 p.s.i. The films were tough and transparent and ranged in thickness from 3 to 5 thousandths of an inch. The melting point $T_m$ was determined for the film using a hot stage microscope, and the glass transition $T_g$ determined using a Perkin-Elmer differential scanning calorimeter. The film was then exposed to the ultra-violet light source described previously for various lengths of time and tested for brittleness. Brittleness was designated as fracture when the sample was bent through a right angle. The time required for the sample to become brittle was recorded. Previous calibration of the light source indicated that 20 hours exposure correspond to approximately one month of summer sunshine.

The results obtained are tabulated below:

| | $T_m$ (° C) | $T_g$ (° C) | Ultra-violet Exposure to produce Brittleness |
|---|---|---|---|
| Example 1 | 263 | 56 | 2 weeks |
| Example 2 | 205 | 14 | 12 hours |
| Example 3 | 246 | 40 | 1 week |
| Example 4 | 216 | 16 | 22 hours |
| Example 5 | 235 | 35 | 1 week |

-continued

| | $T_m$ (° C) | $T_g$ (° C) | Ultra-violet Exposure to produce Brittleness |
|---|---|---|---|
| Example 6 | 230 | 28 | 4 days |

EXAMPLE 8

The procedure of Example 1 was repeated except that 2.09 g of hexamethylene diamine and 0.23 g 1,1 diaminomethyl acetone (3 amino methyl 4 amino 2 butanone) was used with the 3.70 g adipyl chloride. This represents about 1.2% wt keto carbonyl group based on the total polymer. 5.0 g of polymer were obtained with an intrinsic viscosity of 0.52. A film of the polymer was cast from formic acid (0.3 mm) and was irradiated in the U.V. Accelerometer. The effect of the irradiation on the molecular weight of the polymer as measured by viscosity is given below:

unirradiated [η] = 0.52 di/gm
after 72 hrs irradiation [η] = 0.23 di/gm

EXAMPLE 9 a. Preparation of Nylon Salt

In a 250 ml Erlenmeyer flask was placed 13.14 g adipic acid and 2.16 g γmethylγacetyl pimelic acid (prepared by hydrolysis of dicyanoethylated methyl ethyl ketone as per the method of H.A. Bruson, U.S.P. Pat. No. 2,343,606) were dissolved in chloroform with gentle heating and then cooled to about 30° C. A solution of 11.83 g of hexamethylene diamine in chloroform was added quantitatively to the acid solution. Crystallization occurred almost immediately. The salt was filtered and washed with chloroform and air dried. Yield was 25.1 gms = 93%. A 1% aqueous solution of the salt had a pH of 6.9.

b. Preparation of the Copolyamide 1.5 g of the salt was charged into a polymer tube and after several vacuum $N_2$ purge cycles the tubes was sealed off under vacuum. The tube was placed in a steel tube and placed in a solvent bath of boiling tetrahydronaphthalene (206° C.) for 2½ hrs. The sealed polymer tube was opened and the polymer transferred to a melt polymerization tube and the polymerization continued using the method quoted in "Preparative Methods of Polymer Chemistry", 2nd ed by W.R. Sorenson and T.W. Campbell, J. Wiley and Sons, N.Y., 1968, p.75. The copolymer has about 1% by weight carbonyl group. The polymer was reprecipitated from formic acid by water. A slightly opaque film was cast from formic acid solution which was 0.3 mm thick. This was irradiated in a U.V. Accelerometer (American Ultraviolet Co., New Jersey, U.S.A.) for 96 hrs. The change in inherent viscosity (formic acid 1%) is given below:

Initial viscosity before irradiation [η] = 2.00
after 96 hrs irradiation [η] = 0.42

EXAMPLE 10

A mixture of 9.99 g of tetramethylene glycol (1,4-butanediol), 20.70 g of dimethyl sebacate, 2.30 g diethyl butyryl succinate, 0.1 g lithrage, and 0.2 g ditertiary butyl hydroquinone was placed in a polymer tube having a side arm and nitrogen capillary inlet reaching to the bottom of the tube. The reaction was heated at about 176° C. in a vapor bath (p-cymene) for 2 hrs at atmospheric pressure in a current of nitrogen. Then the pressure was slowly reduced over a 4 hr period to 0.05 mm. The temperature was then raised to 215° C. (naphthalene used in vapor bath) for 4 hrs at the same pressure. The reaction was heated overnight. The polymer which was allowed to cool under nitrogen was a pale yellow solid which was dissolved in chloroform and decolorized with Norite.

The copolymer recovered by precipitation from methanol weighed 20.08 g with an intrinsic viscosity of 0.21. This copolymer is referred to as poly(TMS-co-EBS), and contains about 1 weight % ketone carbonyl.

The U.V. spectra of the copolymer showed a characteristic carbonyl absorption band with a peak at 290mμ.

The copolymer was soluble in the common organic solvents such as ethyl acetate, chloroform, etc.

The copolymer was dissolved in ethyl acetate and irradiated under the same conditions as in Example 8. The results are tabulated below.

| Photodegradation of poly(TMS-co-EBS) at 15° C | | | |
|---|---|---|---|
| Time of Irradiation in Minutes | $[\eta]$ | $\overline{M}_n$ | $\dfrac{(M_n)O - 1}{\overline{M}_n}$ |
| 0 | 0.21 | 5890 | 0 |
| 30 | 0.10 | 2400 | 1.50 |
| 60 | 0.07 | 1580 | 2.73 |
| 90 | 0.05 | 1000 | 4.00 |

Based on these results the quantum yield of chain breaking was $5.9 \times 10^{-2}$.

EXAMPLE 11

The method used was the same as described in Example 8 (above). The quantities of reactants used were as follows:

| | |
|---|---|
| butane 1.4 diol | 8.91 gms |
| 1,1 dimethylol acetone | 1.18 gms |
| dimethyl sebacate | 23.00 gms | together with the catalyst and antioxidant of Example 8. This corresponds to about one weight percent keto carbonyl based on total polymer. The polymer was a yellow solid which was dissolved in ethyl acetate and decolorized with Norite. This polymer was called poly(TMS-co-DMAS).

EXAMPLE 12

The method used was the same as described in Example 8. The quantities of reactants used were as follows:

| | |
|---|---|
| 1,4 butane diol | 9.90 gms |
| dimethyl sebacate | 20.70 gms |
| diethyl γacetyl pimelate (prepared by the method of A. Boise, U.S.P. 2,437,906 | 2.58 gms |

This polymer was off-white and called poly(TMS-co-DEAP).

EXAMPLE 13

The polymers referred to in Examples 11 and 12 were pressed into films 0.25 mm thick and irradiated in the U.V. Accelerometer for 48 hrs. Their initial and final intrinsic viscosities (as a measure of molecular weight) are given below.

| | $[\eta]$ CHCl$_3$ | |
|---|---|---|
| | initial | final |
| Example 11 poly(TMS-co-DMAS) | 0.77 | 0.54 |
| Example 12 poly(TMS-co-DEAP) | 0.59 | 0.40 |

EXAMPLE 14

An ester diol from ethylene glycol and 3,3¹(dicyano ethyl) pentane 2,4 dione was prepared following the method of A. Boese U.S.P. Pat. No. 2,437,906 using a 15 fold molar excess of ethylene glycol. The product of esterification was:

$$\text{HOCH}_2\text{CH}_2\text{O}_2\text{CCH}_2\text{CH}_2\text{CHCH}_2\text{CH}_2\text{CO}_2\text{CH}_2\text{CH}_2\text{OH}$$
$$|$$
$$\text{CO}$$
$$|$$
$$\text{CH}_3$$

which was purified by washing through an alumina column to give a viscous liquid.

Preparation of the urethane copolymer 24.08 gms of toluene diisocyanate (Nocconate 80) were dissolved in 50 ml of methyl isobutyl ketone and placed in a three necked, round bottomed flask fitted with a stirrer and protected from moisture. 7.72 gms of ethylene glycol and 4.46 gms of the ester diol in 50 ml of dimethyl sulphoxide was added with rapid stirring and the mixture heated to 120° C. and kept at that temperature for 2 hrs. After cooling, the solution was diluted with 100 mls of methanol and poured into water in a blender. The polymer was washed with water and then reprecipitated from dimethyl sulphoxide solution with water and after further washing dried in a vacuum oven at 60° C.

The powder had an intrinsic viscosity of 0.15 in dimethyl sulphoxide and after 60 hrs irradiation in U.V. Accelerometer the intrinsic viscosity was 0.12.

EXAMPLE 15

Into a three necked round bottomed flask fitted with a stirrer, a distilling receiver and condenser and a thermometer and a means for removing oxygen, is placed 58 gm hexamethylene diamine, 45 gm butanediol, 182 gm sebacic acid, 43.2 methyl γacetyl pimelic acid and 150 ml xylene. The slurry is heated to reflux and the water of condensation was removed via the distilling receiver. As the evolution of water decreases, the xylene was also removed until approximately 40 mls remained. The temperature of the mixture was at this time about 230° C. The condensation was run a further 8 hours. Finally the flask was cooled to 100° C., the viscous solution thinned with xylene and poured into methanol to precipitate the polymer. This polymer had a ketone carbonyl content of about 1% by wt. It had an intrinsic viscosity of 0.4 (dimethyl formamide). After irradiation of a 0.25 mm pressed film 40 hours in a U.V. Accelerometer the intrinsic viscosity in DMF had dropped to 0.28 indicating a substantial decrease in molecular weight.

EXAMPLE 16

An ice cold solution of 17.4 toluene diisocyanate in 100 ml of toluene was added with stirring to a cold solution of 10.4 gm hexamethylene diamine + 1.2 gm 1,1 diamino methyl acetone in 300 ml N HCl solution.

To this mixture was added slowly (keeping the flask cold) 300 ml N NaOH solution during the addition the polymer precipitated. The polymer was filtered, washed, and dried. The polymer had an intrinsic viscosity (DMF) of 1.2 and was cast as a 0.40 mm thick film from DMF.

This film was subjected to light in a U.V. accelerometer for 40 hrs after which intrinsic viscosity of the resultant polymer was 0.35.

EXAMPLE 17 a. Preparation of 5 acetyl 5 methyl hexahydro[2H.Azepin-2-one] (γacetyl γmethyl caprolactam) (Formula I below) γacetyl γmethyl pimelic acid prepared as described in Example 9 was added to a flask with acetic anhydride in the presence of a small amount of potassium acetate and the mixture refluxed for 6 hrs to produce a polyanhydride. The acetic acid and acetic anhydride were distilled off and the residue heated under reduced pressure (10–15 mm Hg) to pyrolyse the polyanhydride. A pale yellow oil distilling between 140 and 145° C. at 12 mm was collected. This was found to be a 10: 8 mixture of II and III.

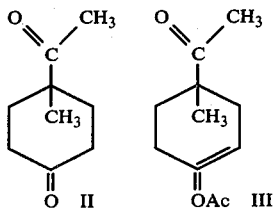

On hydrolysis in aqueous acid conditions compound II was converted to I.

Upon reaction with hydroxylamine compound I ave a solid monoxime which dissolved in sulphuric acid and which on heating gave the rearranged product I which was extracted with methylene chloride after neutralizaton to give a solid whose infra-red spectrum is consistent with the structure I

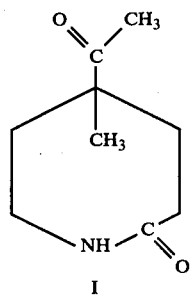

b. Polymer 24 gm of ε caprolactam + 1.05 gm γacetyl γmethyl ε caprolactam prepared as above was placed in a polymer tube having a nitrogen capillary inlet and the caprolactam were melted at 100° C. To the melt was added 0.s013 gms sodium as a dispersion in xylene. The tube was transferred to a vapour bath of boiling diphenyl ether and allowed to remain there 10 minutes. The polymer was cooled broken out of the polymer tube. A film was cast from formic acid (0.3 mm) and irradiated on the U.V. Accelerometer for 40 hours. The effect of the irradiation on the intrinsic viscosity of the polymer is given below:

|  | [η] in formic acid |
|---|---|
| initial | 1.3 |
| after 40 hrs irradiation | 0.5 |

EXAMPLE 18

A solution of 10 gms of a commercial epoxy resin Epon 828 (a diglycidan ether of bisphenol A in 10 mls a 50:5) mixture by volume of methyl cellulsove acetate and xylene was prepared and to this was added 0.5 gm of 1,1 diaminomethyl acetone in 1 ml of methyl cellusolve acetate and stirred. The solution was sprayed onto a tin plate panel after most of the solvent had evaporated in air the plate was heated at 100° C. for ½ hr. A hard film coating was achieved. This coating was denoted composition A. To a similar solution of 10 gms Epon 828 was added 0.5 gm of hexamethylene diamine in 1 ml of methyl cellusolve acetate and stirred. This solution was also sprayed onto a tin plate and baked for ½ hr. at 100° C. to produce a hard film. This was denoted Composition B. After exposure to 72 hrs of U.V. radiation in a U.V. accelerometer and 48 hrs in a salt fog spray significant rusting had occurred on composition A whilst the composition B and the unexposed portion of coating A and tinplate was not affected by the salt fog spray. This indicates that the integrity of the film had been impaired by the photolysis of the cross linking agent.

EXAMPLE 19

| Ingredients | |
|---|---|
| isophthalic acid | 166 gm |
| adipic acid | 148 |
| γmeγacetyl pimelic acid | 40.4 |
| glycerol | 55.2 |
| propylene glycol | 136.8 |
| xylene | 300 |

Into a four necked flask fitted with a stirrer, a distilling receiver and condenser, a thermometer and a nitrogen purge inlet was placed the 300 gm xylene. When the xylene had been heated to approximately 100° C. the rest of the ingredients were charged. The slurry was heated to reflux and the water of condensation collected. As the polymerization proceeded the xylene was removed until 50 gm approximately remained. At this point, the temperature was 215° C. The condensation was continued until 80 ml of water had been collected.

The flask was then cooled and diluted with methyl cellosolve acetate to 55% solid solution. To 250 mls of this solution, 20 gm of cymel 301 (a methylolated metalume) was added and thoroughly mixed. This solution was sprayed onto tin plate panels and baked 15 mins at 350° F. to produce a tough film.

After exposure to ultraviolet radiations for 72 hrs and salt fog spray for 48 hours, the panels showed evidence of rusting.

EXAMPLE 20

Using the procedure and materials of Example 19 but with the replacement of 40.4 gm of γ Me γ acetyl pimelic acid by 29.6 gm adipic acid, a resin was synthesized, blended with methylolated melamine and sprayed onto tin plate.

After exposure to the U.V. weathermometer for 72 hrs and salt fog spray for 48 hrs, no damage to the panels was observed.

What we claim as our invention is:

1. A condensation copolymer obtained by reacting together at least one glycol of general formula HO — $R^4$ — OH where $R^4$ is an organic radical selected from the group consisting of aliphatic, alicyclic, aromatic and araliphatic hydrocarbon radicals, or a polyether or polyester glycol or polyol, at least one diisocyanate of general formula OCN — $R^5$ — NCO where $R^5$ is a divalent hydrocarbon radical selected from the group consisting of aliphatic, alicyclic, aromatic and araliphatic, and a monomer of the formula C:

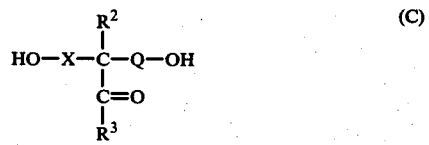

(C)

where X is selected from the group consisting of methylene chains having 0–6 carbon atoms, and methylene chains of 2–6 carbon atoms interrupted by ester linkages, Q is selected from the group consisting of methylene chains having 1–6 carbon atoms, and methylene chains of 2–6 carbon atoms interrupted by ester linkages, $R^2$ is hydrogen or an alkyl group of 1–6 carbon atoms, $R^3$ is an alkyl, aryl, alkaryl or alkenyl group of from 1–12 carbon atoms, the monomer of formula C providing a unit of structure

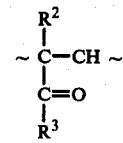

in the backbone of the copolymer, the number of said units being sufficient to provide from about 0.01 weight % to about 3 weight % of ketone carbonyl based upon the total copolymer.

2. A condensation copolymer as claimed in claim 1 wherein $R^5$ is an aromatic radical.

3. A condensation copolymer as claimed in claim 2 wherein the glycol is 1,4-butanediol and the diisocyanate is a mixture of 2,4-tolylenediisocyanate and 2,6-tolylenediisocyanate.

4. A condensation copolymer as claimed in claim 2 wherein the monomer of formula C is 2-acetyl-1,4-butanediol.

* * * * *